(12) United States Patent
Rodgers et al.

(10) Patent No.: US 7,778,168 B1
(45) Date of Patent: Aug. 17, 2010

(54) QUEUING SYSTEM WITH MECHANISM TO LIMIT BLOCKING OF HIGH-PRIORITY PACKETS

(75) Inventors: Arthur G. Rodgers, Windsor, CO (US); Mark A. Buchanan, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 1190 days.

(21) Appl. No.: 10/710,772

(22) Filed: Aug. 2, 2004

(51) Int. Cl.
*H04L 12/28* (2006.01)
(52) U.S. Cl. .................................. 370/230; 370/232
(58) Field of Classification Search ................. 370/432, 370/230
See application file for complete search history.

(56) References Cited

U.S. PATENT DOCUMENTS

| | | | | |
|---|---|---|---|---|
| 5,309,432 A | * | 5/1994 | Kanakia | 370/412 |
| 5,541,912 A | * | 7/1996 | Choudhury et al. | 370/412 |
| 6,091,709 A | * | 7/2000 | Harrison et al. | 370/235 |
| 6,842,423 B1 | * | 1/2005 | Erimli et al. | 370/235 |
| 6,907,001 B1 | * | 6/2005 | Nakayama et al. | 370/230 |
| 6,959,002 B2 | * | 10/2005 | Wynne et al. | 370/412 |
| 7,058,064 B2 | * | 6/2006 | Nemirovsky et al. | 370/395.7 |

* cited by examiner

*Primary Examiner*—Tim T. Vo
*Assistant Examiner*—Mahesh H Dwivedi
(74) *Attorney, Agent, or Firm*—Christopher P. Maiorana, PC (57) ABSTRACT

A method, computer program product, and queuing system for queuing prioritized items (such as network packets), which limits the degree to which higher-priority queue items are blocked by lower priority queue items, is disclosed. A preferred embodiment of the present invention uses a simple first-in-first-out (FIFO) queue as an input queue, along with an output queue corresponding to each packet priority. A strategy is applied at the output queues to guarantee that blocking of high-priority queue items in the input queue will be limited in duration. One disclosed strategy is to enforce a constraint that whenever an output queue of any priority becomes full, the output port will stop accepting packets of any priority until all queues have space for at least one packet of each priority. Another strategy is for the output port to stop accepting packets having priorities greater than or equal to the priority of the full queue.

20 Claims, 7 Drawing Sheets

QUEUING SYSTEM WITH MECHANISM TO LIMIT BLOCKING OF HIGH-PRIORITY PACKETS

TECHNICAL FIELD

The present invention relates generally to priority queuing systems used in networked computer systems, such as routers. In particular, the present invention provides a method, computer program product, and queuing system in which blockage of high-priority packets is prevented.

BACKGROUND ART

In recent years, the computer and electronics industries have experienced a trend toward adopting network-like architectures (commonly referred to as I/O "fabrics") for performing input/output functions traditionally performed by buses and bus-like structures. These include storage-area network (SAN) architectures such as INFINIBAND®. As in the case of wide-area networks, such as the Internet, many of these intra-system fabrics transmit data in the form of packets, which are routed through fabric-attached components referred to as "switches." This routing of packets is commonly referred to as "packet switching."

In some packet switching fabrics, a priority may be assigned to packets to facilitate routing through the fabric. The RAPIDIO™ protocol, an industry interconnection standard for embedded systems, is an example of one such packet switching protocol. In the RAPIDIO™ protocol, higher-priority packets are intended to have shorter transmission latencies than lower priority packets. Thus, higher-priority packets may pass lower-priority packets in the fabric.

A packet switch is implemented with a number of ports. Each port may act as an input port (accepting packets from outside the switch), or as an output port (transmitting packets to destinations outside of the switch), or, most commonly, a port may act as both an input and an output port.

If a switch has a packet queue on an input port, higher-priority packets that arrive after lower-priority ones can be blocked in the input queue, due to the inability of the switch to route the lower-priority packets that are ahead in the input queue. Since higher-priority packets are intended to have shorter transmission latencies than their lower-priority counterparts, this blocking is clearly undesirable.

Existing solutions to this problem include eliminating the input queue and equipping the port with multiple parallel input queues (one for each priority). These existing solutions, however, suffer from a number of drawbacks. In particular, these existing solutions tend to be expensive in terms of hardware requirements or implementation complexity.

If a switch has only output queuing (and no input queue), extensive buffering of packets is required. In particular, one output queue per priority per input port is needed. This scheme becomes unacceptably expensive as the number of ports in the switch grows.

Input ports that have separate input queues for each priority add both complexity and cost to the implementation. Moreover, such a design may also lower overall through-put by making less efficient use of memory buffers, as each individual input queue is only allowed to hold packets of a particular priority.

Thus, what is needed is a simple, inexpensive queuing system in which blocking of high-priority packets is reduced. The present invention provides a solution to this and other problems, and offers other advantages over previous solutions.

SUMMARY OF INVENTION

A preferred embodiment of the present invention provides a method, computer program product, and queuing system for queuing prioritized items, such as network packets, in a manner that limits the degree to which higher-priority queue items are blocked by lower priority queue items. A preferred embodiment of the present invention uses a simple first-in-first-out (FIFO) queue as an input queue, along with an output queue corresponding to each packet priority. A strategy is applied at the output queues to guarantee that blocking of high-priority queue items in the input queue will be limited in duration.

In a preferred embodiment of the present invention in which the queuing system is interposed between input and output ports of a network switch or router, the output port must transmit waiting higher-priority packets before transmitting low priority packets. Two strategies are disclosed whereby an output port may determine whether to accept new packets in its output queues. These two strategies have the effect of lowering the degree to which high-priority packets are blocked by lower-priority packets in the input queue.

The first of these strategies is to enforce a constraint that whenever an output queue of any priority becomes full, the output port will stop accepting packets of any priority until all queues have space for at least one packet of each priority. This strategy ensures that space will quickly become available to accept whatever priority packet is waiting at the head of an input queue.

The second of these strategies is for the output port to stop accepting packets having priorities greater than or equal to the priority of the full queue. This strategy can potentially relieve the blocking of high-priority packets at the input port queues more quickly than the first strategy, since any lower-priority packets that are at the head of an input queue can potentially be moved out of the way more quickly. The logic required to implement the second strategy is somewhat more complex than that for the first strategy, however, since the input queue must indicate the priority of the packet at the head of the queue so that the destination output port can determine if it can accept that packet.

These and various other features and advantages that characterize the present invention will be apparent upon reading of the following detailed description and review of the associated drawings.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF PREFERRED EMBODIMENTS

The following is intended to provide a detailed description of an example of the invention and should not be taken to be limiting of the invention itself. Rather, any number of variations may fall within the scope of the invention, which is defined in the claims following the description.

Figure 1:
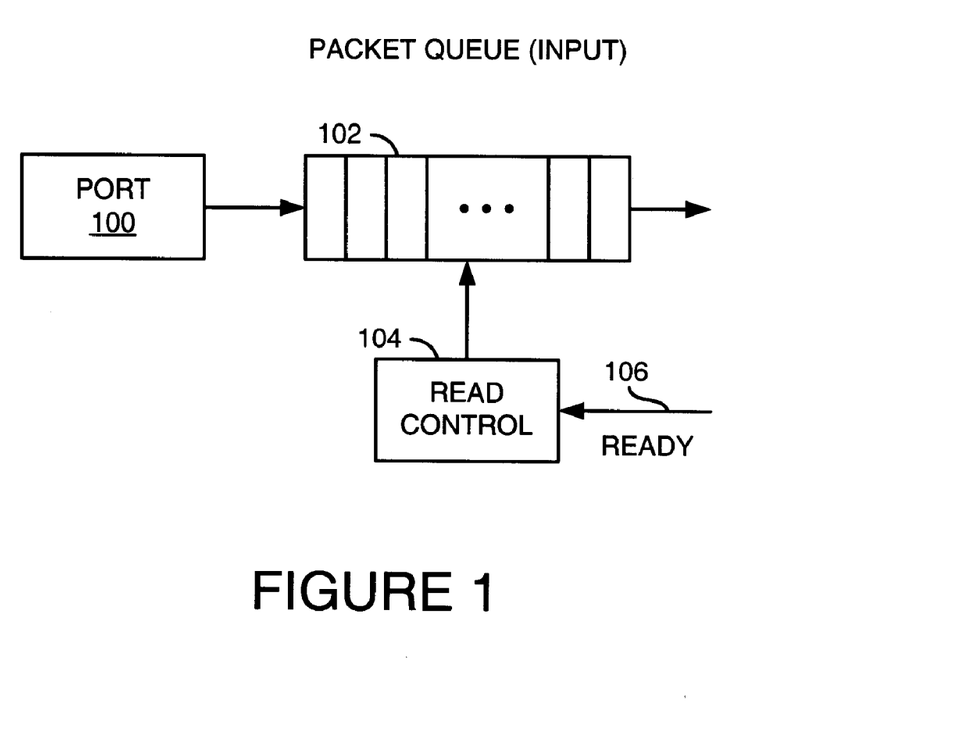
FIG. 1 is a diagram of an input port and input queue in accordance with a first preferred embodiment of the present invention.

Turning now to FIG. 1, a diagram of an input queue in accordance with a first preferred embodiment of the present invention is depicted. This embodiment is preferably implemented in the form of a digital logic circuit for inclusion in a network switch or router at an input port. In this first preferred embodiment, blocking of high-priority packets is limited or prevented through the enforcement of a constraint that whenever an output queue of any priority becomes full, the output port will stop accepting packets of any priority until all queues have space for at least one packet of each priority.

It should be noted that in a preferred embodiment of the present invention, in which the presently described queuing system is employed, there will be multiple input ports and output ports, such that packets may be routed from any of a plurality of input ports to a correct output port, according to the intended destination of the packet. Thus, in an actual embodiment, a single output port may receive packets from any of a number of input ports. Likewise, a single input port may provide packets to any of a number of output ports. For clarity, however, only a single input port and output port are described here.

Figure 2:
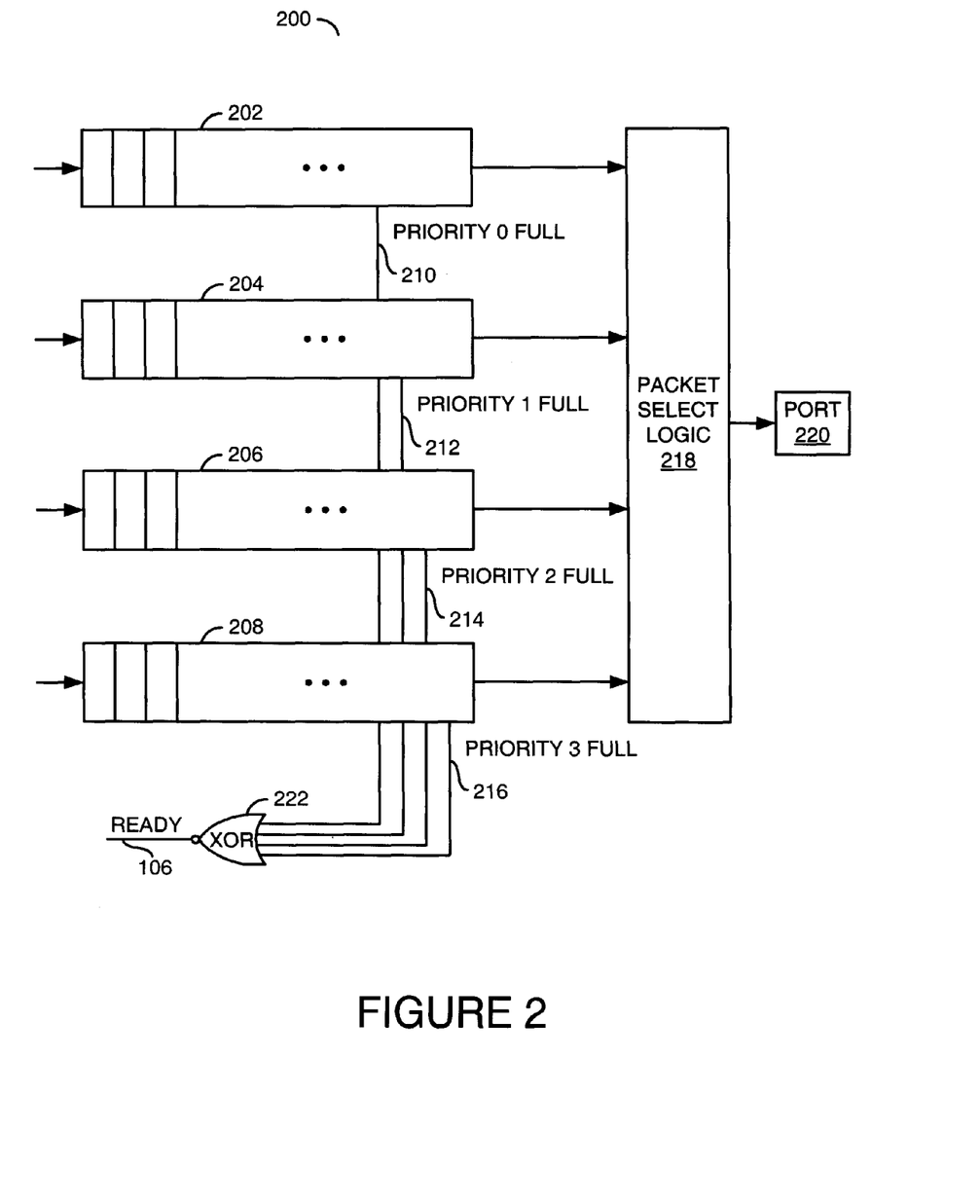
FIG. 2 is a diagram of output queues and an output port in accordance with a first preferred embodiment of the present invention.

Packets are received (from the network or from an attached host) via port 100 and are pushed onto the tail of input queue 102, which is a simple first-in-first-out (FIFO) queue. Packets exit from the head of input queue 102 for subsequent insertion onto an output queue (as depicted in FIG. 2). The exit of packets from input queue 102 is controlled by read control circuitry 104, which allows a packet to exit input queue 102 only if "ready" signal 106 is asserted by the destination output port.

Turning now to FIG. 2, a series of output queues 202, 204, 206, and 208 are provided. Each of output queues 202, 204, 206, and 208 is associated with a particular priority level. In this example, four priority levels, numbered 0-3, are depicted, with 0 being the lowest priority and 3 being the highest priority. Each of output queues 202, 204, 206, and 208 receives only those packets from input queue 102 that have a priority that matches the priority of that particular output queue. For example, since output queue 206 is associated with priority level 2, output queue 206 will receive only those packets from input queue 102 that have a priority level of 2.

Packet selection logic 218 has the responsibility of picking the next packet from output queues 202, 204, 206, and 208 to submit to port 220 for transmission. In order to give meaning to the priority scheme, packet selection logic 218 picks the highest priority packet contained in one of output queues 202, 204, 206, and 208. Alternatively stated, a packet may not be selected for transmission on port 220 unless there are no higher-priority packets available (on the higher-priority output queues).

Each of output queues 202, 204, 206, and 208 outputs a full indicator signal (signals 210, 212, 214, and 216, respectively) that, when asserted, indicates that its respective output queue is full. Thus, for example, when output queue 202 is full, output queue 202 asserts full indicator signal 210. Full indicator signals 210, 212, 214, and 216 form the inputs to a nor gate 222, which outputs "ready" signal 106 to read control 104 (in FIG. 1).

The result of this arrangement is that a packet may not leave input queue 102 if any of the output queues at the destination port (output queues 202, 204, 206, and 208) is full. Thus, when a packet leaves input queue 102, there must be at least one space available on each of output queues 202, 204, 206, and 208 at the destination port. This ensures that space will quickly become available to accept whatever priority packet is waiting at the head of the input queue.

Figure 3:
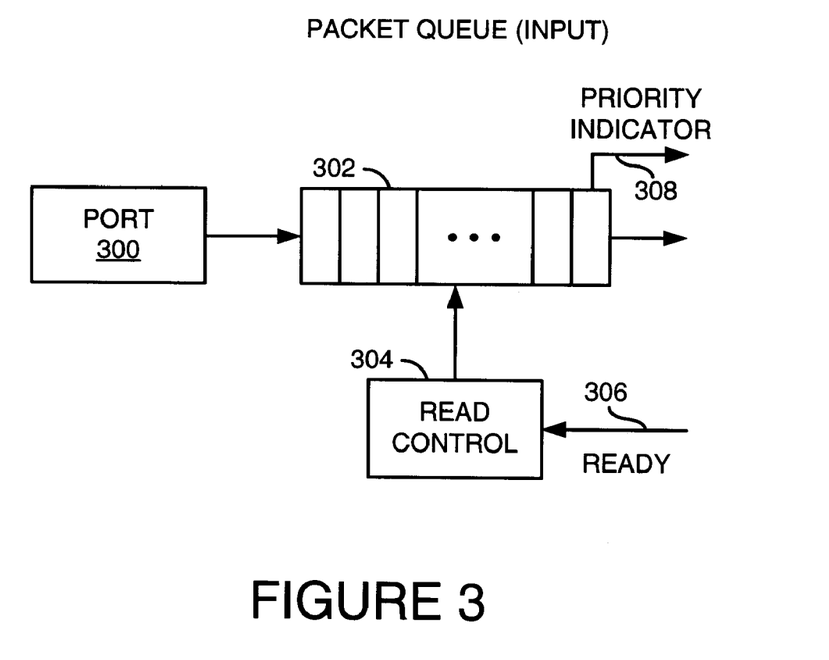
FIG. 3 is a diagram of an input port and input queue in accordance with a second preferred embodiment of the present invention.
Figure 4:
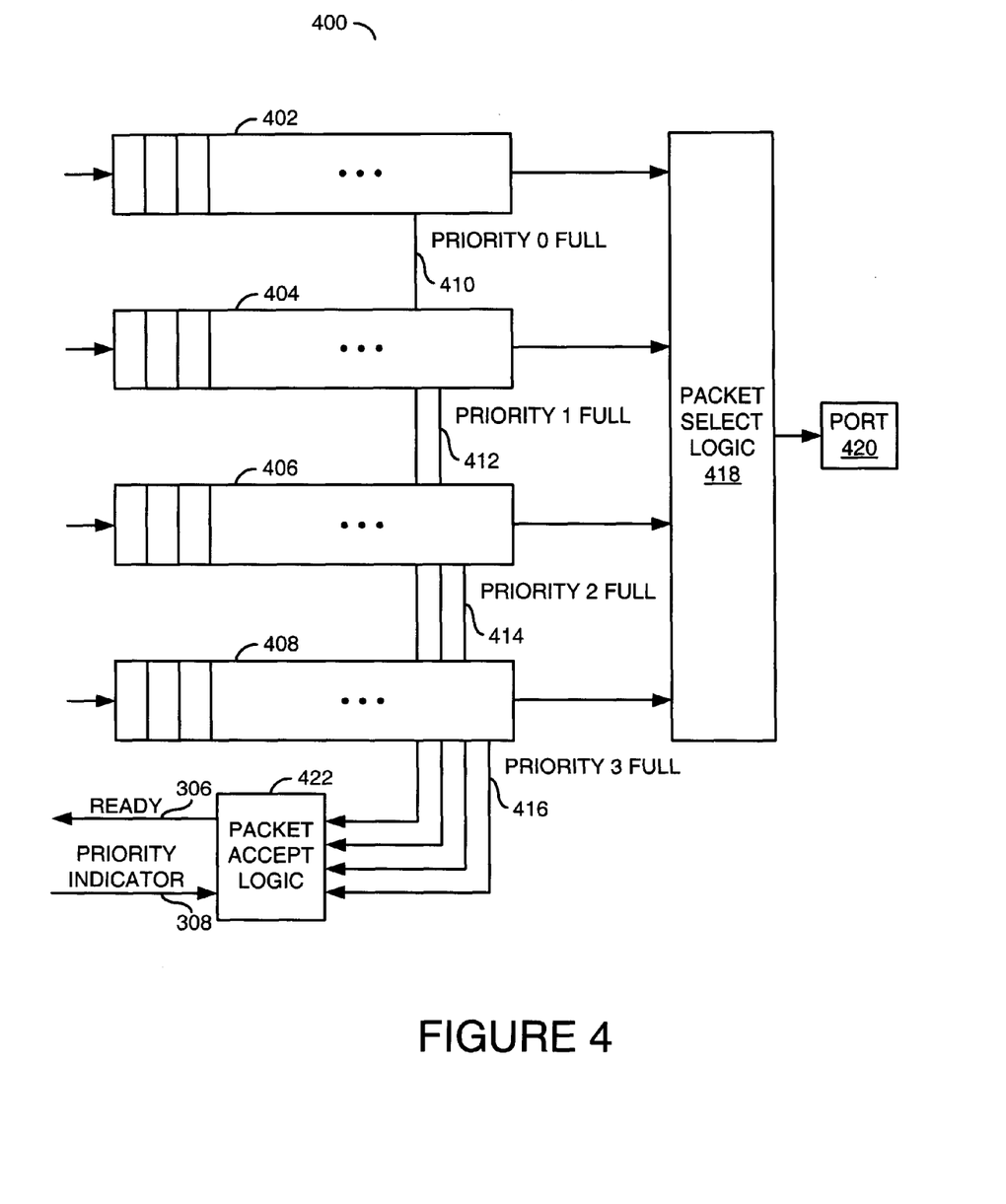
FIG. 4 is a diagram of output queues and an output port in accordance with a second preferred embodiment of the present invention.

FIG. 3 and FIG. 4 depict a second preferred embodiment of the present invention. In FIG. 3, an input queue 302 for use in this second preferred embodiment is depicted. Packets are received (from the network or from an attached host) via port 300 and are pushed onto the tail of input queue 302, which, like input queue 102 in FIG. 1, is a simple first-in-first-out (FIFO) queue. Packets exit from the head of input queue 302 for subsequent insertion onto one of the output queues at the destination port, depicted in FIG. 4. The exit of packets from input queue 302 is controlled by read control circuitry 304, which allows a packet to exit input queue 302 only if "ready" signal 306 is asserted. An additional priority indicator signal 308 is provided by input queue 302, which indicates the priority level of the packet found at the head of input queue 302.

Turning now to FIG. 4, a series of output queues 402, 404, 406, and 408 are provided. As in the embodiment depicted in FIG. 2, each of output queues 402, 404, 406, and 408 is associated with a particular priority level. Each of output queues 402, 404, 406, and 408 receives only those packets from input queue 302 that have a priority that matches the priority of that particular output queue.

Packet selection logic 418 has the responsibility of picking the next packet from output queues 402, 404, 406, and 408 to submit to port 420 for transmission. As with the embodiment described in FIG. 2, packet selection logic 418 packs the highest-priority packet contained in one of output queues 402, 404, 406, and 408.

As in FIG. 2, each of output queues 402, 404, 406, and 408 outputs a full indicator signal (signals 410, 412, 414, and 416, respectively) that, when asserted, indicates that its respective output queue is full. However, unlike the embodiment in FIG. 2, which fed indicator signals 210, 212, 214, and 216 into nor gate 222, full indicator signals 410, 412, 414, and 416 form the input to a packet accept logic circuit 422, which also accepts priority indicator 308 as an input. Packet accept logic circuit 422 asserts its "ready" signal output 306 if and only if either 1.) there are no full output queues (i.e., none of full indicator signals 410, 412, 414, and 416 are asserted) or 2.) the priority indicated by priority indicator 308 from the source input port is less than the priority of the highest-priority output queue that is full.

Thus, for example, if output queue 406 is the only output queue that is full, "ready" signal 306 will be asserted if priority indicator 308 indicates that the packet at the head of input queue 302 at the source port is either 1 or 0, since those priorities are less than priority level 2, the priority level of the full queue (output queue 406). If, on the other hand, priority indicator 308 indicates that the packet at the head of input queue 302 has a priority level of 2 or 3, "ready" signal 306 will not be asserted.

The result of this arrangement is that a packet may not leave queue 102 if it has a priority that is higher than the priority of a full output queue. This strategy can potentially relieve the blocking of high-priority packets at input queue 302 more quickly than that depicted in FIG. 1 and FIG. 2, since any lower-priority packets that are at the head of input queue 302 can potentially be moved out of the way more quickly. The logic required to implement this second preferred embodiment is somewhat more complex than that for the first embodiment, however, since additional logic circuitry is required to produce priority indicator 308 and to interpret priority indicator 308 and full indicator signals 410, 412, 414, and 416 (i.e., packet accept logic 422).

One of ordinary skill in the art will recognize that the fact that both of the above-described preferred embodiments achieve the goal of reducing the blocking of high-priority packets is not immediately obvious. That is, requiring a high-priority packet at the head of the input queue to wait until all output queues (or all lower-priority output queues, in the second embodiment) have at least one empty space before exiting the input queue seems counterintuitive, since one would intuitively expect that placing such a delay on a higher-priority packet would slow down the transmission of higher-priority packets. In practice, however, it can be readily confirmed that the above-described schemes actually serve to reduce the overall latency of higher-priority packets.

One of ordinary kill in the art will recognize that a number of variations on the preferred embodiments depicted in FIGS. 1 through 4 are possible without departing from the scope and spirit of the present invention. For example, one possible generalization of the two previously mentioned schemes is to assert a "full indicator signal" at some point before an output queue becomes full, such as when the output queue has only one available space, for instance. In an alternative embodiment, the point at which the "full indicator signal" is asserted may be determined by way of a programmable threshold.

Figure 5:
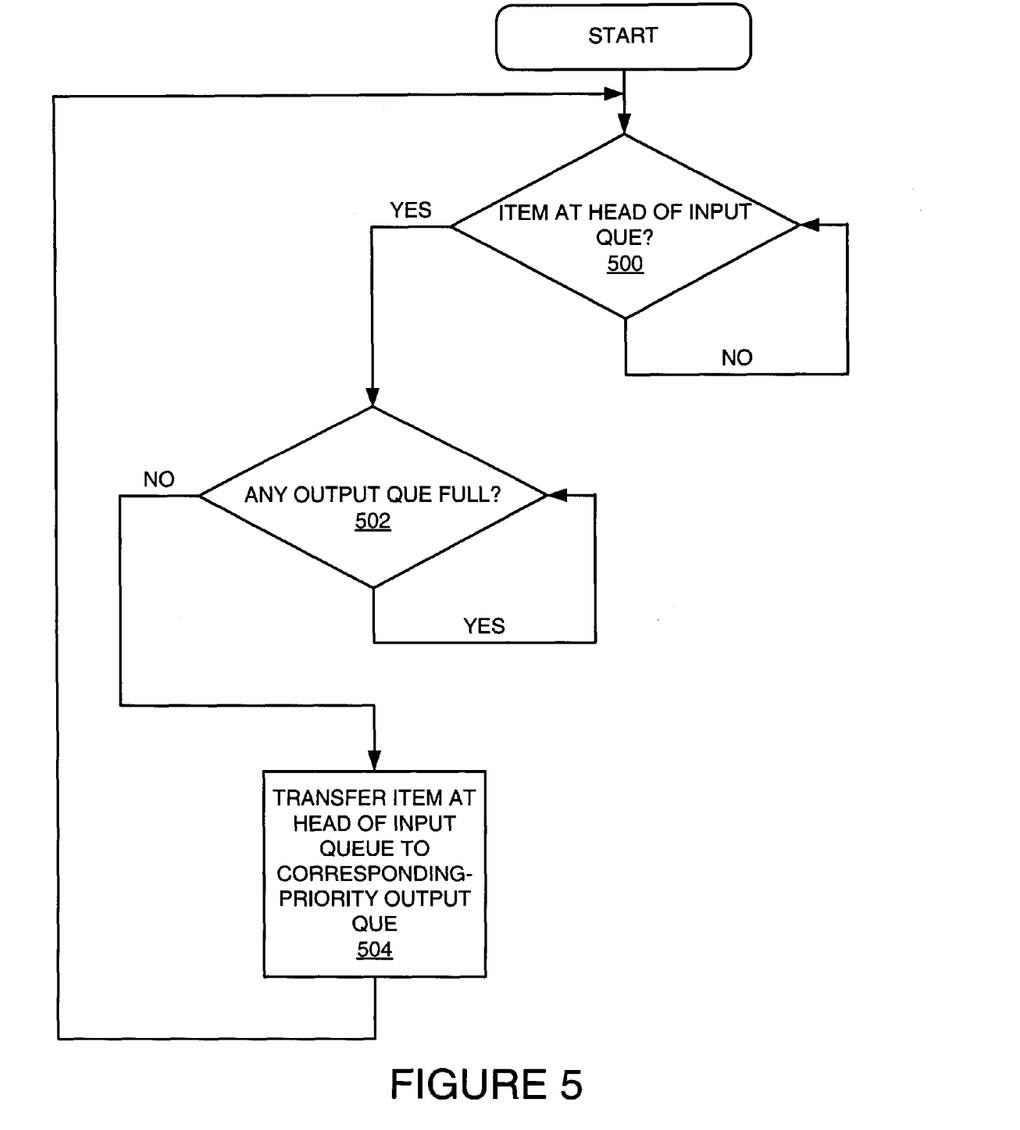
FIG. 5 is a flowchart representation of a process of administering a queuing system in accordance with a first preferred embodiment of the present invention.
Figure 6:
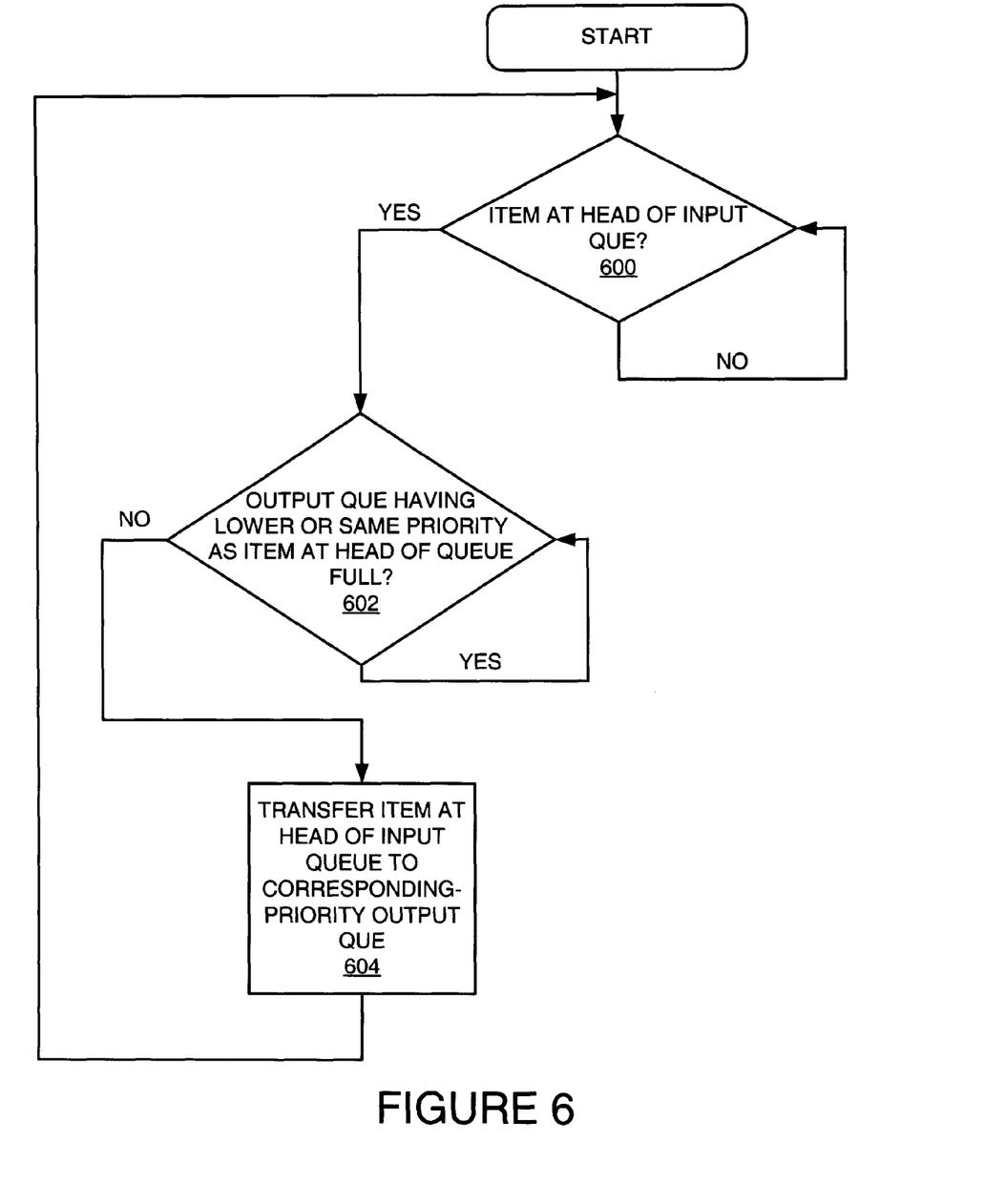
FIG. 6 is a flowchart representation of a process of administering a queuing system in accordance with a second preferred embodiment of the present invention.

One of ordinary skill in the art will also recognize that the queuing system(s) described above are not limited in application to networks, but that the teachings of the present invention may be applied with equal effectiveness in other application areas that require priority queuing. In addition, one of ordinary skill in the art will recognize that an embodiment of the present invention need not be implemented as a "hard-wired" logic circuit, but may be implemented in the form of software for execution on a computer system or embedded computing device. As shown in FIG. 5 and FIG. 6 the teachings of the present invention may be embodied in the form of a method, which, in turn, may be implemented in the form a computer-readable medium of instructions or other functional descriptive material that direct(s) the computer to perform the actions of method.

FIG. 5 is a flowchart representation of a method of administering a queuing system in accordance with the aforementioned first preferred embodiment of the present invention. A determination is made as to whether an item (such as a packet) exists at the head of the input queue (block 500). If not (block 500:No), the process is suspended (or loops) until such an item exists. If such an item does exist (block 500:Yes), a determination is made as to whether any output queue is full (block 502). If so (block 502:Yes), the process is suspended (or loops) until all output queues at the destination port have at least one empty space. Once all output queues have at least one empty space (block 502:No), the item at the head of the input queue is transferred to an output queue of corresponding priority (block 504) and the process repeats itself (block 500).

FIG. 6 is a flowchart representation of a method of administering a queuing system in accordance with the aforementioned first preferred embodiment of the present invention. A determination is made as to whether an item (such as a packet) exists at the head of the input queue (block 600). If not (block 600:No), the process is suspended (or loops) until such an item exists. If such an item does exist (block 600:Yes), a determination is made as to whether any output queue at the destination port having the same or lower priority than the item at the head of the queue is full (block 602). If so (block 602:Yes), the process is suspended (or loops) until all output queues having the same or lower priority have at least one empty space. Once all output queues have at least one empty space (block 602:No), the item at the head of the input queue is transferred to an output queue of corresponding priority (block 604) and the process repeats itself (block 600).

Figure 7:
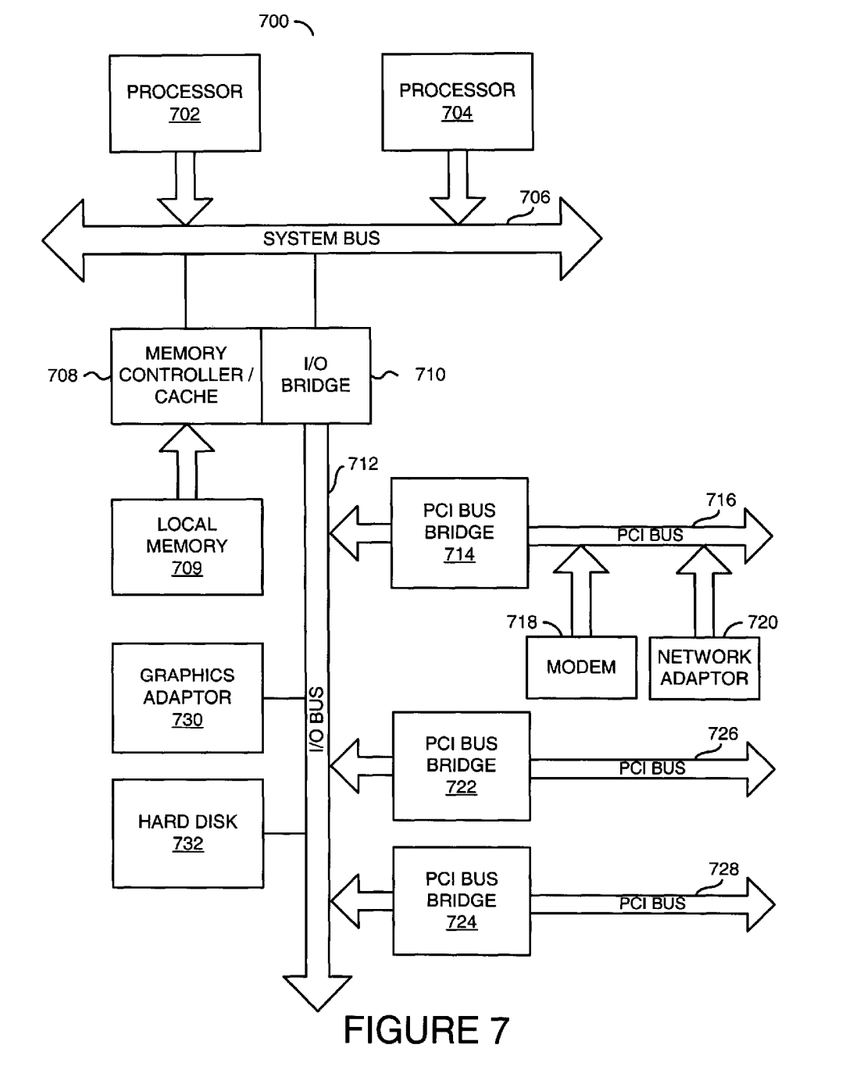
FIG. 7 is a block diagram of a computer system capable of carrying out the processes of a preferred embodiment of the present invention.

Referring to FIG. 7, a block diagram of a computer system in which a preferred embodiment of the present invention may be implemented is depicted. Computer system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of devices, such as modems, network adapters, storage system adapters, and the like may be connected to PCI local bus 716. Typical PCI bus implementations will support four PCI expansion slots or add-in connectors. Communications links to other computer systems modem 718 and/or network adapter 720, which are connected to PCI local bus 716 through add-in boards.

Additional PCI bus bridges 722 and 724 provide interfaces for additional PCI local buses 726 and 728, from which additional modems, network adapters, or other peripherals may be supported. In this manner, data processing system 700 allows connections to multiple network computers. A memory-mapped graphics adapter 730 and hard disk 732 may also be connected to I/O bus 712 as depicted, either directly or indirectly.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a software application, namely, a set of instructions (program code) or other functional descriptive material in a code module that may, for example, be resident in the random access memory of a computer. Until required by the computer, the functional descriptive material may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:
receiving a plurality of queue items at an input queue, wherein the input queue feeds a plurality of output queues that feed one or more output ports, wherein each of the plurality of queue items has a corresponding queue item priority and a corresponding output port from the one or more output ports, and wherein each of the plurality of output queues at an output port has a corresponding queue priority;
determining whether a particular one of a plurality of output queues contains a number of queue items that meets or exceeds a pre-determined amount; and
in response to a determination that the particular one of the plurality of output queues contains a number of queue items that meets or exceeds the pre-determined amount, preventing any queue items that have a same corresponding output port as the particular one of the plurality of output queues and that have a queue item priority greater than or equal to the queue priority of the particular one of the plurality of output queues from exiting the input queue.

2. The method of claim 1, wherein the pre-determined amount is a capacity of the particular one of the plurality of output queues.

3. The method of claim 1, wherein the queue items are packets in a packet-switching fabric.

4. The queuing system of claim 3, wherein, upon exit of a packet from one of the plurality of output queues, the packet is transmitted over the packet-switching fabric.

5. The method of claim 1, wherein if any of the plurality of output queues contains a number of queue items that meets or exceeds the pre-determined amount, no queue items are allowed to exit the input queue until all of the plurality of output queues contain numbers of queue items that are less than the pre-determined amount.

6. The method of claim 5, wherein the pre-determined amount is a capacity of the particular one of the plurality of output queues.

7. A computer program product in a computer-readable medium, comprising functional descriptive material that, when executed by a computer, causes the computer to perform actions that include:
receiving a plurality of queue items at an input queue, wherein the input queue feeds a plurality of output queues that feed one or more output ports, wherein each of the plurality of queue items has a corresponding queue item priority and a corresponding output port from the one or more output ports, and wherein each of the plurality of output queues at an output port has a corresponding queue priority;
determining whether a particular one of a plurality of output queues contains a number of queue items that meets or exceeds a pre-determined amount; and
in response to a determination that the particular one of the plurality of output queues contains a number of queue items that meets or exceeds the pre-determined amount, preventing any queue items that have a same corresponding output port as the particular one of the plurality of output queues and that have a queue item priority greater than or equal to the queue priority of the particular one of the plurality of output queues from exiting the input queue.

8. The computer program product of claim 7, wherein the pre-determined amount is a capacity of the particular one of the plurality of output queues.

9. The computer program product of claim 7, wherein the queue items are packets in a packet-switching fabric.

10. The computer program product of claim 9, wherein, upon exit of a packet from one of the plurality of output queues, the packet is transmitted over the packet-switching fabric.

11. The computer program product of claim 7, wherein if any of the plurality of output queues contains a number of queue items that meets or exceeds the predetermined amount, no queue items are allowed to exit the input queue until all of the plurality of output queues contain numbers of queue items that are less than the pre-determined amount.

12. A queuing system comprising:
an input queue; and
a plurality of output queues,
wherein each of the plurality of output queues is associated with a corresponding queue priority and a corresponding output port,
wherein each of the plurality of output queues receives queue items from a head of the input queue, and
wherein if a particular one of the plurality of output queues contains a number of queue items that meets or exceeds a pre-determined amount, no queue items that have a same corresponding output port as the particular one of the plurality of output queues and that have a queue item priority that is greater than or equal to that of the particular one of the plurality of output queues are allowed to exit the input queue until the particular one of the plurality of output queues contains a number of queue items that is less than the pre-determined amount.

13. The queuing system of claim 12, wherein the predetermined amount is a capacity of the particular one of the plurality of output queues.

14. The queuing system of claim 12, wherein the queue items are packets in a packet-switching fabric.

15. The queuing system of claim 14, wherein, upon exit of a packet from one of the plurality of output queues, the packet is transmitted over the packet-switching fabric.

16. The queuing system of claim 12, wherein if any of the plurality of output queues contains a number of queue items that meets or exceeds the pre-determined amount, no queue items are allowed to exit the input queue until all of the plurality of output queues contain numbers of queue items that are less than the predetermined amount.

17. The queuing system of claim 16, wherein the predetermined amount is a capacity of the particular one of the plurality of output queues.

18. The queuing system of claim 12, wherein the queuing system is implemented as a logic circuit.

19. The queuing system of claim 12, wherein each of the plurality of output queues receives only those queue items that have a queue item priority that matches the queue priority of that output queue.

20. The queuing system of claim 19, wherein no queue item may exit one of the plurality of output queues if there is a non-empty higher-priority output queue.

\* \* \* \* \*